United States Patent [19]

Hug et al.

[11] Patent Number: 5,012,479
[45] Date of Patent: Apr. 30, 1991

[54] ULTRAVIOLET METAL VAPOR LASER HAVING HARD SEALED INTERNAL MIRRORS

[76] Inventors: William F. Hug, 382 E. California Blvd., Pasadena, Calif. 91106; Manfred R. Otto, 1016 Corinthian Way, Pomona, Calif. 91767

[21] Appl. No.: 388,148

[22] Filed: Aug. 1, 1989

Related U.S. Application Data

[63] Continuation-in-part of Ser. No. 142,019, Jan. 11, 1988.

[51] Int. Cl.$^5$ .................................................. H01S 3/22
[52] U.S. Cl. ...................................... 372/56; 372/107; 372/103
[58] Field of Search .......................... 372/56, 103, 107

[56] References Cited

U.S. PATENT DOCUMENTS 4,233,568 11/1980 Hamerdinger et al. ............ 372/107

OTHER PUBLICATIONS

CRC "Handbook of Laser Science & Technology", vol. II, Gas Lasers, p. 206, by Marvin J. Weber.

Primary Examiner—Léon Scott, Jr.
Attorney, Agent, or Firm—W. Edward Johansen

[57] ABSTRACT

An ultraviolet metal vapor laser tube includes an elongated envelope, an active laser medium, an output coupling mirror assembly which is disposed on one end of the elongated envelope and a reflector mirror assembly which is disposed on the other end thereof. The active laser medium consists of helium gas and cadmium vapor and is contained in the elongated envelope. A partially reflecting multilayer dielectric coating is formed on the inner surface of a glass substrate to form the output coupling mirror assembly. The glass substrate has a thickness in the range of 3.0 to 10.0 millimeters and transmits at least 85% of light energy at a wavelength of 325 nanometers. A reflecting multilayer dielectric coating is formed on the inner surface of a glass substrate and is substantially reflective of light energy at a wavelength of 325 nanometers to form the reflector mirror assembly. A first metal flange member has an aperture formed therein and mounts the output coupling mirror assembly at one end of the elongated envelope. The second metal flange member has a second metal member which has an aperture formed therein and mounts the reflector mirror at the other end of the elongated envelope. A glass solder bonds the output coupling and reflector mirror assemblies to the first and second metal flange members, respectively, all of which have coefficients of thermal expansion which are substantially equal.

1 Claim, 1 Drawing Sheet

ULTRAVIOLET METAL VAPOR LASER HAVING HARD SEALED INTERNAL MIRRORS

This application is a continuation-in-part of an application filed Jan. 11, 1988, under Ser. No. 142,019.

BACKGROUND OF THE INVENTION

1. Field of the Invention

The present invention relates to a metal vapor laser and more particularly to an ultraviolet metal vapor laser, such as a helium-cadmium laser, which uses a glass substrate which has a thickness in the range of 3.0 to 10.0 millimeters and which transmits at least 85% of light energy at a wavelength of 325 nanometers for the output coupling mirror assembly in order to simplify fabrication of the ultraviolet metal vapor laser and increase its lifetime.

2. Description of the Prior Art

Metal vapor lasers, such as helium-cadmium lasers, have been commercially available for a number of years. Some of these metal vapor lasers are capable of producing outputs of light energy in the deep blue visible region of the spectrum at 442 nanometers. These helium-cadmium lasers operating at the 442 nanometer laser emission line utilize a hard glass to metal sealed laser resonator internal to the plasma tube. Other of these metal vapor lasers are capable of producing outputs of light energy having a wavelength of 325 nanometers. These ultraviolet metal vapor lasers, such as helium-cadmium lasers, operating at the 325 nanometer laser emission line utilize plasma tubes which are sealed at the ends with fused silica or cyrstaline quartz brewster angle windows. Within the plasma tube is a mixture of two or more gases which serve as the optically active laser gain medium. When such mixture is exited by a direct current discharge, ultraviolet laser lines are excited. Laser mirrors situated at either end of the laser plasma tube, and external to the plasma tube were used in a resonant cavity to cause optical feedback of ultraviolet light amplified in the active gain region of the plasma tube. Schott K5 glass and Schott BK7 glass are used for visible light energy at a wavelength of 442 nanometers. Both glasses have the ability to be fritted at a temperature below 500 degrees Centigrade. Schott is the trademark of Schott Glaswerke, Mainz, West Germany. Schott K5 and Schott BK7 are codes which Schott Optical Glass Company, Durlyea, Pa. uses to designate glass.

Damage of intracavity optical elements, such as the brewster windows and damage of the laser mirror coating occur when exposed to a beam of ultraviolet light energy. The intracavity power is fifty to one hundred times the emitted ultraviolet power so that the intracavity optical elements are subjected to a substantial ultraviolet light energy density and are damaged thereby. The damaged optical elements cause loss of intracavity transmission. Higher losses within the laser mirror optical coating subsequently causes loss of emitted laser power. The influence of intracavity losses on the emitted power of a laser is very non-linear in that a very small intracavity optical loss will cause a very large loss in emitted output of the laser discharge plasma tube thereby reducing the lifetime of the ultraviolet metal vapor laser.

The most common ultraviolet transmission materials used for intracavity optical element or laser mirror substrates are crystaline quartz or synthetic fused silica. These materials have a very low thermal expansion coefficients and are not suitable for hard glass to metal sealing at low temperatures in the range of from 300 to 500 degrees Centigrade. It is important to have a hard glass to metal sealing temperature within this range because the common materials for reflecting multilayer dielectric coatings will be destroyed during the sealing process if sealing temperatures are above this range. A typical failure of reflecting multilayer dielectric coating during hard glass to metal sealing is "crazing" which is the cracking of the reflecting multilayer dielectric coating to thermal expansion mismatch of the dielectric stack with the substrate material.

It is desirable to improve the lifetime of ultraviolet metal vapor laser by eliminating both intracavuity optical elements which can be damaged by the intracavity laser beam and protecting the critical reflecting multilayer dielectric coating of the laser mirror from damage by the ultraviolet laser beam. It is also desirable to provide these improvements while providing good optical transmission of ultraviolet light energy outside the resonator cavity and at the same time providing a good hermetic vacuum sealing for the plasma tube which is impermeable to contaminant gases and vapors entering the plasma tube as well as to gases and vapors leaking from within the plasma tube.

U.S. Pat. No. 4,233,568, entitled Laser Tube Mirror Assembly, issued to Randolph W. Hamerdinger and Robert C. McQuilan on Nov. 11, 1980, teaches a laser tube assembly which includes a laser tube and pair of laser mirrors. The laser tube has a hard glass to metal sealed laser resonator which is internal to the plasma tube for use in a helium-cadmium laser. Each laser mirror is sealed to one end of the laser tube. The sealant is able to withstand the relatively high temperatures which are utilized to remove contaminants during fabrication thereof. The sealant is also able to minimize gas permeation therethrough during utilization of the laser tube.

U.S. Pat. No. 3,904,986, entitled Gas Laser Tube, issued to Karl Gerhard Hernqvist on Sept. 9, 1975, teaches a gas laser tube which includes an elongated envelope, an active laser medium, an output coupling mirror assembly which is disposed on one end of the elongated envelope and a reflector mirror assembly which is disposed on the other end thereof.

U.S. Pat. No. 4,149,779, entitled Internal Laser Mirror Alignment Fixture, issued to Randolph W. Hamerdinger on Apr. 17, 1979, teaches a laser tube mirror alignment fixture.

U.S. Pat. No. 4,224,579, entitled Metal Vapor Laser Discharge Tube, issued to Calvin J. Marlett, Edwin A. Reed, Richard C. Johnson and William F. Hug on Sept. 23, 1980, teaches a metal vapor laser which includes an envelope, a capillary tube, an anode, a cathode and a pair of mirrors. The metal vapor laser discharge tube also includes a reservoir of helium, an evaporator and a condenser. The evaporator is fluidly coupled to the capillary tube adjacent to the anode. An active material is placed in the evaporator. The condenser is fluidly coupled to the capillary tube adjacent to the cathode. The laser discharge tube further includes a heater. The heater is mechanically coupled to the evaporator. The heater applies heat to the active material in the evaporator in order to produce a vapor the positive ions of which the cathode draws to the condenser.

SUMMARY OF THE INVENTION

In view of the foregoing factors and conditions which are characteristic of the prior art it is the primary object of the present invention to provide for use in an ultraviolet metal vapor laser, such as a helium-cadmium laser, a glass substrate which has a thickness in the range of 3.0 to 10.0 millimeters and which transmits at least 85% of light energy at a wavelength of 325 nanometers for the output coupling mirror assembly in order to simplify fabrication of an ultraviolet metal vapor laser and increase its lifetime.

It is another object of the present invention to provide a ultraviolet metal vapor laser tube which incorporates hard glass to metal sealing of laser mirrors internal to the plasma tube thereby eliminating the need for an intracavity brewster window and providing substantial transmission of ultraviolet light through the glass substrate, which is the bulk material of the output laser mirror, external to the laser cavity.

It is still another object of the present invention to provide for use in an ultraviolet metal vapor laser tube a glass substrate which has a thermal coefficient in a temperature range which is suitable for making a hard glass to metal seal in a temperature range which the reflecting multilayer dielectric coatings of the output coupling and reflector mirror assemblies are able to withstand.

In accordance with the present invention an embodiment of an ultraviolet metal vapor laser tube is described. The ultraviolet metal vapor laser tube includes an elongated envelope, an active laser medium, an output coupling mirror assembly which is disposed on one end of the elongated envelope and a reflector mirror assembly which is disposed on the other end thereof. The active laser medium consists of helium gas and cadmium vapor and is contained in the elongated envelope. A partially reflecting multilayer dielectric coating is formed on the inner surface of a glass substrate to form the output coupling mirror assembly. The glass substrate has a thickness in the range of 3.0 to 10.0 millimeters and transmits at least 85% of light energy at a wavelength of 325 nanometers. A reflecting multilayer dielectric coating is formed on the inner surface of a glass substrate and is substantially reflective to light energy at a wavelength of 325 nanometers to form the reflector mirror assembly. A first metal flange member has an aperture formed therein and mounts the output coupling mirror assembly at one end of the elongated envelope. The second metal flange member has a second metal member which has an aperture formed therein and mounts the reflector mirror at the other end of the elongated envelope. A glass solder bonds the output coupling and reflector mirror assemblies to the first and second metal flange members, respectively, all of which have coefficients of thermal expansion which are substantially equal.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
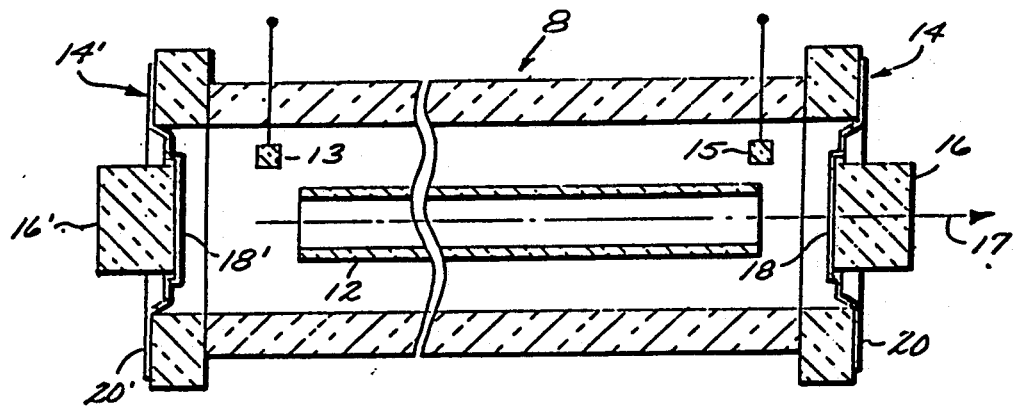
FIG. 1 is a partial longitudinal cross-sectional view of a first ultraviolet metal vapor laser tube which includes a first output coupling mirror assembly which has been made in accordance with the principles of a first embodiment of the present invention.

In order to best understand the present invention it is necessary to refer to the following description of its preferred embodiment in conjunction with the accompanying drawing. Referring to FIG. 1 a first ultraviolet metal vapor laser tube 8 includes an elongated envelope 10, a central bore 12, an active laser medium, an output coupling mirror assembly 14 and a reflector mirror assembly 14'. The active laser medium consists of helium gas and cadmium vapor and is contained in the elongated envelope 10. The output coupling and reflector mirror assemblies 14 and 14' include a first glass substrate 16 and a second glass substrate which are disposed on opposite ends of the elongated envelope 10. A partially reflecting multilayer dielectric coating 18 is formed on the inner surface of the first glass substrate 16 to form the output coupling mirror assembly 14 and is optimally transmissive to light energy at a wavelength of 325 millimeters. The first glass substrate 16 has a thickness in the range of 3.0 to 10.0 millimeters and transmits at least 85% of light energy at a wavelength of 325 nanometers. A reflecting multilayer dielectric coating 18' is formed on the inner surface of the second glass substrate 16' to form the reflector mirror assembly 14' and is reflective of light energy at a wavelength of 325 millimeters. The output coupling and reflector mirror assemblies 14 and 14' have apertured, recessed cup-shaped metal flange members 20 and 20'. The first ultraviolet metal vapor laser tube 8 includes the elongated envelope 10 is tubular and gas-tight. The bore 12 is first vacuated to a very low pressure and is then filled with a lasing gas fill, such as helium gas and cadmium vapor, to a subatmospheric pressure. The elongated envelope 10 is made of glass, quartz, ceramic or metal. A cathode 13 and an anode 15 form an electrode structure which is contained adjacent to the ends of the bore 12 in order to excite an electrical discharge in the gaseous medium. Optical radiation emitted from the discharge passes in a beam axially to the output coupling and reflector mirror assemblies 14 and 14' to define an optical resonator having a resonant frequency at the optical wavelength of the radiation emitted by the gaseous discharge.

Figure 2:
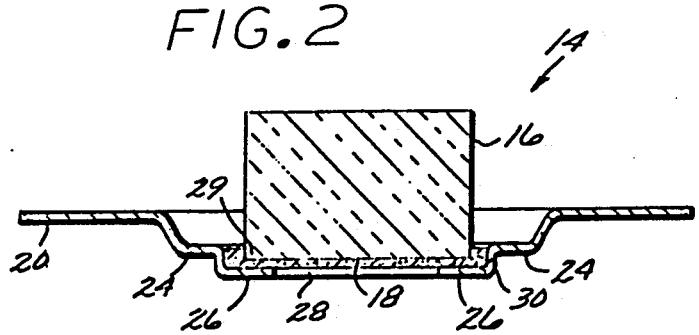
FIG. 2 is cross-sectional view of the first output coupling mirror assembly of FIG. 1.

Referring to FIG. 1 in conjunction with FIG. 2 the partially reflecting multilayer dielectric coating 18 is made only partially reflecting so that a small percentage of the optical radiation falling thereon passes through it to form the output beam of the laser. The reflecting multilayer dielectric coating 18' is made totally reflective of ultraviolet radiation incident thereon. The light reflecting back and forth between the axially aligned mirrors assemblies 14 and 14' through the first ultraviolet metal vapor laser tube 8 produces a coherent emission of optical radiation to form the coherent beam 17. The ultraviolet helium-cadmium laser provides an output of light energy at a wavelength of 325 nanometers. The output coupling and reflector mirror assemblies 14 and 14' seal the ends of the first ultraviolet metal vapor laser tube 8. The apertured, recessed cup-shaped metal flange members 20 and 20' are hard glass to metal sealed to the first and second glass substrates 16 and 16' with the reflecting multilayer dielectric coatings 18 and 18' in an manner which U.S. Pat. No. 4,233,568 describes.

U.S. Pat. No. 4,233,568 neither teaches an ultraviolet metal vapor laser tube nor does it teach an output coupling assembly which uses a glass substrate having a thickness in the range of 3.0 to 10.0 millimeters and transmiting at least 85% of light energy at a wavelength of 325 nanometers. The use of this glass substrate is essential in forming the output coupling mirror assembly.

Still referring to FIG. 1 in conjunction with FIG. 2 glass solder 30 bonds the output coupling and reflector mirror assembly 14 and 14' to the metal flange members 20 and 20', respectively. The first and second glass substrates 16 and 16', the glass solder, and the metal members 20 and 20' all have coefficients of thermal expansion which are substantially equal. The metal flange members 20 and 20' of the output coupling and reflector mirror assemblies 14 and 14' are thereafter joined to mating flange members 22 and 22', respectively, which are joined to the opposite ends of the envelope 10 by welding or soldering or any other standard technique. The first ultraviolet metal vapor laser tube 8, with opposite ends sealed by the output coupling and reflector mirror assemblies 14 and 14', is then subjected to bake-out procedures in order to remove contaminants in the first ultraviolet metal vapor laser tube 8.

Referring to FIG. 2 the output coupling mirror assemblies 14 includes a disc-shaped metal flange member 20 having a series of internal, concentric steplike portions 24 and 26 of decreasing diameter. At the lower portions of the metal flange member 20 corresponding to step-like portion 26 is an aperture 28 having a diameter of at least 4.0 millimeters. The diameter is preferably of such a size that when the metal flange member 20 is joined to the mating flange member 22, it closely conform to at least the diameter of the bore 12. The partially reflecting multilayer dielectric coating 18 partially reflects the incident radiation so that a portion of radiation is passed through the first glass substrate 16 to form the output beam 17. The partially reflecting multilayer dielectric coating 18 defines one end wall of an optical resonator. The reflector mirror assembly 14' is similar to the output coupling assembly 14 except that the reflecting multilayer dielectric coating 18' is totally reflecting to define the other end wall of the optical resonator.

The surface area of the reflecting multilayer dielectric coating 18 may be substantially coextensive with the area of aperture 28 or may extend over the complete surface 29 of the first glass substrate 16. The first glass substrate 16 is a selected glass which is joined to the metal flange member 20 by the glass solder 30 which is either a vitreous (PbO-B2O3-Al2O3-SiO2 or PbO-ZnO-B2O3 systems) or a devitrifying (PbO-B2O3-ZnO-SiO2) systems) glass solder and which is chosen to match the thermal coefficient of expansion of the first glass substrate 16 and the metal flange member 20 in order to minimize the possibility of seal failure during operation of the first ultraviolet metal vapor laser tube 8. The hard glass to metal seal allows the first ultraviolet metal vapor laser tube 8 to be processed at a relatively high temperature in the range of from 100 to 300 degrees Centigrade in order to remove contaminants and reduce gas permeation through the sealant. The glass solder 30, the metal flange member 20 and the first glass substrate 16 must have closely matched thermal coefficients of expansion and the first glass substrate 16 must retain its mechanical dimensions during and after thermal cycling to the fritting temperatures which are in a range from 300 to about 500 degrees Centigrade.

The first glass substrate 16 should be as thin as possible along the optical axis of the first ultraviolet metal vapor laser tube 8 while retaining its mechanical dimensions during and after thermal cycling. The preferred range of thickness is from 3.0 to 5.0 millimeters and up to 10.0 millimeters depending upon the diameter of the first glass substrate 16. The first glass substrate 16 should not allow deformation of the surface contour of its interior and exterior surface during manufacture or during operation when the interior will be at a near vacuum and the first glass substrate 16 will be under some level of stress. Normally for high quality mirror the ratio of its diameter to its thickness is between 1.5 and 4 in order maintain surface contour of better than a quarter wavelength. The exact amount of deformation allowable on the surface of laser mirrors depends on the detailed geometry of the laser design and the sensitivity of the plasma tube design to aberrations. The design fabricated in accordance with the teaching of the invention, a mirror of a diameter of 15 millimeters had a thickness of 5.0 millimeters. The ratio is 3. The first ultraviolet metal vapor laser tube 8 is insensitive to thermal cycling within a predetermined temperature range and is not affected by humidity. The first ultraviolet metal vapor laser tube 8 has relatively long shelf and operating lifetimes.

It is important to not only have the highest transmission possible for the laser transmitting, but also provide the other necessary mirror requirements which include the ability to be hard glass to metal sealed and to be able to maintain the surface contour needed by the plasma tube design. The optical transmission can be made higher by making laser mirror thinner and by selecting glass substrate material which are more transmissive to light energy at a wavelength of 325 nanometers.

The range of glass material selected to be used are those which have an ability to be fritted at a low temperature and a high bulk transmission at a wavelength of 325 nanometers. The reflecting multilayer dielectric coatings 18 and 18' can neither be damaged nor be destroyed by the fritting process which takes place at 500 degrees Centigrade.

Although Schott UBK7 glass is the one of choice. Other Schott glasses which may be used include UVFK50, UVFK51, UVFK52, UVFK53, UV-1, and UV-7. Hoya UBS250 may also be used.

The solder glass 30, when held in suspension by a low viscosity carrier, allows the resultant slurry to be applied to a sealing area by dipping, pressure flow or by brusing or by the use of glass solder preforms. When the slurry or preform, is fired according to a predetermined schedule, a change in the slurry occurs. The glass material develops a partially crystaline structure which results in a strong and devitrified hard glass to metal seal. U.S. Pat. No. 4,233,568 discloses the conventional process steps for forming the hard glass to metal seal. U.S.

Pat. No. Re. 25,791 describes the charateristics of the solder glass to be used in the process. Corning 7575 glass solder is used with the glass substrate which is formed from Schott UBK7 glass and a metal flange which is formed out of Carpenter #49 metal alloy of 49% nickel and 51% iron.

The reflecting multilayer dielectric coatings 18 and 18' must withstand the fritting temperature required to form the hard glass to metal seal between the metal flange member and the substrate in the range of 300 to 500 degrees Centigrade and the temperature required to bake-out the plasma tube under a vacuum the range of 100 to 300 degrees Centigrade. Typical materials for the reflecting multilayer dielectric coatings 18 and 18' which meet this criteria include, but are not limited to, titanium dioxide, zirconia, hafnium oxide, cerium oxide, silicon dioxide, magnesium fluoride, calcium fluoride, indium oxide, tin oxide, lithium fluoride, sodium fluoride, cryolite and thoria. U.S. Pat. No. 4,233,568 teaches these materials. The reflecting multilayer dielectric coatings 18 and 18' may include alternate layers of the aforementioned materials, the layers being adjusted for stoichiometric balance as well as for precise thicknesses.

U.S. Pat. No. 4,233,568 teaches the use of Schott K5 glass, but for light energy at a wavelength of 325 nanometers Schott K5 glass has a transmission of about 78% through a glass substrate having a thickness of 5.0 millimeters. The use of Schott BK7 glass has also been considered, but for light energy at a wavelength of 325 nanometers Schott BK7 glass has a transmission of about 81% through a glass substrate having a thickness of 5.0 millimeters. The glass of choice is Schott UBK7 glass which has a transmission of 92% at 325 millimeters through a glass substrate having a thickness of 5.0 millimeters. Although Schott K5 glass and Schott BK5 glass could used for making a hard glass to metal sealed ultraviolet helium-cadmium laser these glass substrates would be too thin in order to obtain the same transmission as the Schott UBK7 glass and would not be capable of maintaining a good surface contour at this transmission. Schott UBK7 glass has a thermal coefficient of expansion of $88 \times 10$ per degree Centigrade.

Figure 3:
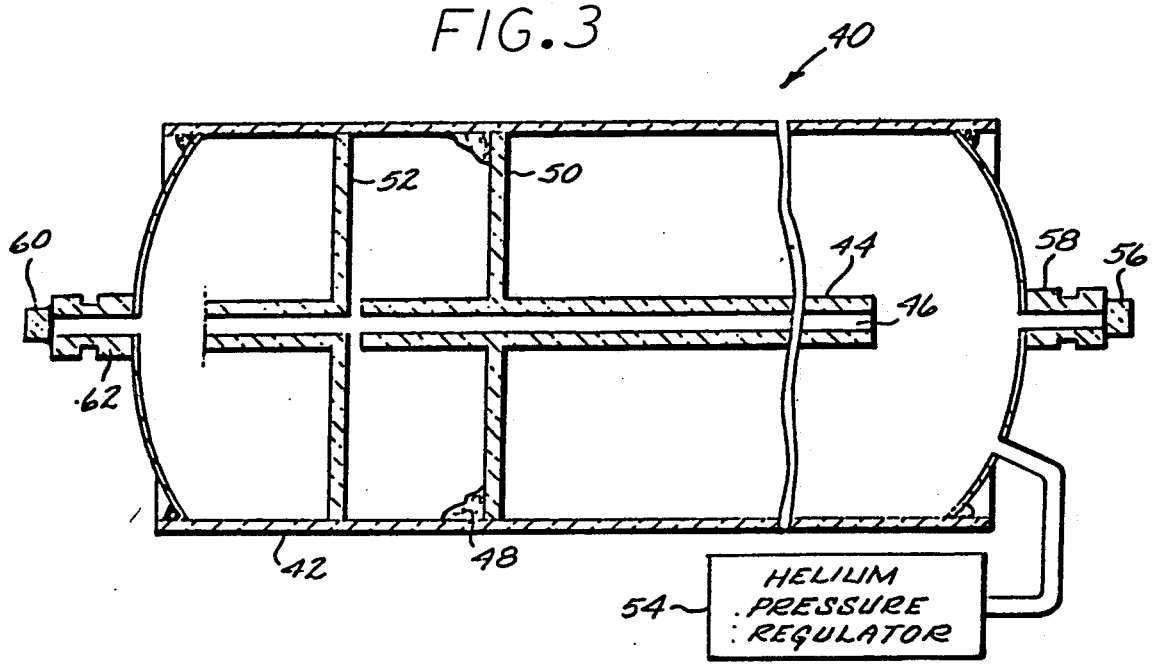
FIG. 3 is a longitudinal cross-sectional view of a second ultraviolet metal vapor laser tube which includes a second output coupling mirror assembly which has been made in accordance with the principles of a second embodiment of the present invention.

Referring to FIG. 3 a second helium-cadmium metal vapor laser tube 40 uses an alternate configuration of the laser mirror mounting assemblies. U.S. Pat. No. 4,224,579 teaches a metal vapor laser which includes an envelope, a capillary tube, an anode, a cathode and a pair of mirrors. The metal vapor laser discharge tube also includes a reservoir of helium, an evaporator and a condenser. The evaporator is fluidly coupled to the capillary tube adjacent to the anode. An active material is placed in the evaporator. The condenser is fluidly coupled to the capillary tube adjacent to the cathode. The laser discharge tube further includes a heater. The heater is mechanically coupled to the evaporator. The heater applies heat to the active material in the evaporator in order to produce a vapor the positive ions of which the cathode draws to the condenser. The second helium-cadmium metal vapor laser tube 40 includes a glass tube body 42 having a bore 44 with a main discharge capillary 46 as the optical gain region. A reservoir 48 of cadmium is located between glass disc support members 50 and 52. A helium pressure regulator 54 is also provided. The details of the second helium-cadmium metal vapor laser tube 40, other than the specific combination of a substrate metal mounting member and solder glass, are conventional and are not considered part of the invention. A partially transmitting laser mirror 56 includes a partially transmissive reflecting layer and an ultraviolet transmissive frittable substrate is hard glass to metal sealed to a metal mounting member 58 is made out of a nickel/iron alloy. On the other end of the second helium-cadmium metal vapor laser tube 40 is a totally reflecting mirror 60 which includes a transmissive reflecting layer and an ultraviolet transmissive glass substrate is hard glass to metal sealed to a metal mounting member 62 which is also made out of a nickel/iron alloy. U.S. Pat. No. 3,904,986 teaches a gas laser tube which includes an elongated envelope, an active laser medium, an output coupling mirror assembly which is disposed on one end of the elongated envelope and a reflector mirror assembly which is disposed on the other end thereof.

The hard glass to metal sealed, bakeable laser reflectors were tested to quantify the vacuum tightness, temperature sensitivity, humidity and operating and shelf lifetimes of the sealed laser reflector assemblies. The hermeticity of each assembly was tested by utilizing a mass spectrometer leak detector peaked for helium detection. It was determined that the vacuum tightness of the laser reflector assemblies tested were leak tight to less than $3 \times 10$ atmospheres cubic centimeters per second.

The gas tubes have reflector assemblies mounted thereto were thermally cycled from minus 45 to 100 degrees Centigrade twenty-five times. Further, the laser tubes were cold-soaked for 100 hours at a minus 45 degrees Centigrade condensable environment. The light energy output was utilized as a measure of the laser reflector performance and the light energy output was not significantly changed after thermal cycling and cold soaking. The laser reflectors therefore retained their optical properties and leak tightness.

The operating lifetime of the ultraviolet metal vapor laser tubes using the forementioned output coupling and reflector mirror assemblies has been greater than 4000 hours with the plasma tube being cycled more than 500 times without failure. The shelf life of ultraviolet metal vapor laser tubes using the output coupling and reflector mirror assemblies has been tested and has yielded lifetimes of approximately two years without failure.

From the foregoing it can be seen that an ultraviolet metal vapor laser tube, such as a helium-cadmium laser, which uses a glass substrate which has a thickness in the range of 3.0 to 10.0 millimeters and which transmits at least 85% of light energy at a wavelength of 325 nanometers for the output coupling and reflector mirror assemblies has been described. The use of this glass substrate simplifies fabrication of the ultraviolet metal vapor laser and increases its lifetime. It should be noted that the sketches are not drawn to scale and that distance of and between the figures are not to be considered significant.

What is claimed is:

1. An ultraviolet metal vapor laser tube comprising:
   a. an elongated envelope;
   b. an active laser medium consisting of helium gas and cadmium vapor and being contained in said elongated envelope;
   c. an output coupling mirror assembly which is disposed on one end of said elongated envelope and which is formed from a glass substrate which has a thickness in the range of 3.0 to 10.0 millimeters and transmits at least 85% of light energy at a wavelength of 325 nanometers, said glass substrate having a partially reflecting multilayer dielectric coating formed on its inner surface, said partially reflecting multilayer dielectric coating being optimally transmissive to light energy within the ultraviolet spectrum;

d. a reflector mirror assembly which is disposed on the opposite end of said elongated envelope and which is formed from a glass substrate which has a reflecting multilayer dielectric coating formed on its inner surface, said reflecting multilayer dielectric coating being substantially reflective to light energy at a wavelength of 325 nanometers;

e. first mounting means for mounting said output coupling mirror assembly at one end of the elongated envelope, said first mounting means having a first metal flange member which has an aperture formed therein;

f. second mounting means for mounting said reflector mirror at the other end of the elongated envelope, said second mounting means having a second metal flange member which has an aperture formed therein; and g. a glass solder which bonds said output coupling mirror assembly and said reflector mirror assembly to said first and second metal flange members, respectively, whereby said output coupling mirror assembly, said reflector mirror assembly, said glass solder and said first and second metal flange members have coefficients of thermal expansion which are substantially equal.

* * * * *